(12) United States Patent
Hoke et al.

(10) Patent No.: US 10,761,879 B2
(45) Date of Patent: Sep. 1, 2020

(54) SERVICE BLUEPRINT CREATION FOR COMPLEX SERVICE CALLS

(71) Applicant: SAP SE, Walldorf (DE)

(72) Inventors: Benjamin Hoke, Bad Schönborn (DE); Jochen Wilhelm, Sandhausen (DE); Steffen Koenig, Heidelberg (DE); Rouven Krebs, Ettlingen (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 16/011,751

(22) Filed: Jun. 19, 2018

(65) Prior Publication Data

US 2019/0384630 A1  Dec. 19, 2019

(51) Int. Cl.
*G06F 9/48* (2006.01)

(52) U.S. Cl.
CPC ..................... *G06F 9/48* (2013.01)

(58) Field of Classification Search
CPC ...... G06F 16/972; G06N 3/08; G06Q 30/016; H04L 67/02
See application file for complete search history.

(56) References Cited

U.S. PATENT DOCUMENTS

| | | | |
|---|---|---|---|
| 6,775,657 B1 | 8/2004 | Baker | |
| 6,827,578 B2 | 12/2004 | Krebs et al. | |
| 6,839,850 B1 | 1/2005 | Campbell et al. | |
| 7,181,768 B1 | 2/2007 | Ghosh et al. | |
| 7,313,618 B2 | 12/2007 | Braemer et al. | |
| 7,844,829 B2 | 11/2010 | Meenakshisundaram | |
| 8,644,755 B2 | 2/2014 | Krebs et al. | |
| 2003/0151629 A1 | 8/2003 | Krebs et al. | |
| 2003/0152899 A1 | 8/2003 | Krebs et al. | |
| 2003/0152900 A1 | 8/2003 | Krebs et al. | |
| 2003/0154176 A1 | 8/2003 | Krebs et al. | |
| 2003/0188189 A1 | 10/2003 | Desai et al. | |
| 2004/0117658 A1 | 6/2004 | Klaes | |
| 2007/0073519 A1 | 3/2007 | Long | |
| 2009/0248473 A1 | 10/2009 | Doenig et al. | |
| 2010/0094886 A1 | 4/2010 | Krebs | |
| 2010/0199169 A1* | 8/2010 | Gnech | G06F 16/972 715/234 |
| 2010/0212013 A1 | 8/2010 | Kim et al. | |
| 2012/0158556 A1* | 6/2012 | Said | G06Q 30/04 705/30 |
| 2013/0007244 A1* | 1/2013 | Gnech | G06F 8/61 709/223 |
| 2015/0033322 A1 | 1/2015 | Wang et al. | |
| 2015/0237067 A1 | 8/2015 | Talyansky | |
| 2017/0169217 A1 | 6/2017 | Rahaman et al. | |
| 2018/0012232 A1* | 1/2018 | Sehrawat | G06Q 30/016 |

OTHER PUBLICATIONS

U.S. Appl. No. 15/665,700, filed Aug. 1, 2017, Rouven Krebs.
U.S. Appl. No. 15/665,758, filed Aug. 1, 2017, Rouven Krebs.
U.S. Appl. No. 15/673,691, filed Aug. 10, 2017, Krebs et al.

* cited by examiner

*Primary Examiner* — Dong U Kim (74) *Attorney, Agent, or Firm* — Fish & Richardson P.C.

(57) ABSTRACT

Methods, systems, and computer-readable storage media for executing service calls, and include receiving a service call including a flat structure of a set of key-value pairs, providing a blueprint including one or more blueprint expressions, for at least one blueprint expression included in the blueprint, determining a specific value by processing at least one blueprint expression of the blueprint using a value of a key-value pair, and providing the specific value for execution of the process.

20 Claims, 6 Drawing Sheets

SERVICE BLUEPRINT CREATION FOR COMPLEX SERVICE CALLS

BACKGROUND

REST-based interfaces are the de-facto standard for communication within modern web applications, service-oriented architectures, micro-services, and integration of legacy applications into modern environments, among many other use cases. For example, and independent of these use cases, process engines are an architectural pattern often used to fulfil the actual goals, and/or logic. Common examples are booking processes (e.g., hotel booking, vehicle rental booking), or purchase processes (e.g., purchasing goods or service from an e-commerce website). Another example includes landscape management systems that execute of management operations in complex datacenters.

From a user-perspective, following a workflow through a process is often referred to as a roadmap. Within such a roadmap, users interactively modify data for each step, or keep default values, for example. External inputs, outputs from previous steps, and/or context information might be processed in each step to create an output for the respective step. This can be used, for example, for a conditional selection between different subsequent steps, and/or for modifying the options/data within the subsequent steps. The data existing in the roadmap is translated into individual operations within a process being executed by a respective process engine to achieve the actual goal(s). In some examples, the roadmap steps may auto-generate code representing the process without a process engine.

When integrating a software product into a more complex scenario (e.g., where the execution of a roadmap is just a sub-part), interfaces must be provided to transfer the information into the roadmap without user interaction. Such integrations can be a time-consuming, resource-inefficient, and error prone process. The technical interfaces are not/insufficiently documented, complicated, complex, and/or do not reflect what users view from the UIs.

SUMMARY

Implementations of the present disclosure are directed to executing interface-based processes based on one or more service calls. More particularly, implementations of the present disclosure are directed to executing a service call based on a respective blueprint that includes one or more expressions that are evaluated at runtime to execute an underlying process.

In some implementations, actions include receiving a service call including a flat structure of a set of key-value pairs, providing a blueprint including one or more blueprint expressions, for at least one blueprint expression included in the blueprint, determining a specific value by processing at least one blueprint expression of the blueprint using a value of a key-value pair, and providing the specific value for execution of the process. Other implementations of this aspect include corresponding systems, apparatus, and computer programs, configured to perform the actions of the methods, encoded on computer storage devices.

These and other implementations can each optionally include one or more of the following features: the template is structured based on the process and includes at least one value that is specific to an implementation of the process; the blueprint is structured based on the template, and each BPE is an abstraction of a respective value of the template; a roadmap automation component receives the service call, and retrieves the blueprint; providing the blueprint includes retrieving the blueprint from a blueprint repository based on a blueprint identifier provided in the service call, the blueprint including one or more blueprint expressions; the blueprint is provided in Javascript object notation (JSON); and the service call includes a Representational State Transfer (REST) service call.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to executing interface-based processes based on one or more service calls. More particularly, implementations of the present disclosure are directed to executing interface-based processes using modified templates, referred to as blueprint-based templates that include dynamically evaluated expression within a request body. Implementations can include actions of receiving a service call including a flat structure of a set of key-value pairs, providing a blueprint including one or more blueprint expressions, for at least one blueprint expression included in the blueprint, determining a specific value by processing at least one blueprint expression of the blueprint using a value of a key-value pair, and providing the specific value for execution of the process.

To provide further context for implementations of the present disclosure, and as introduced above, interfaces can be used for communication within modern web applications, service-oriented architectures, micro-services, and integration of legacy applications into modern environments, among many other use cases. Example interfaces can include, without limitation, REST (Representational State Transfer) interfaces, which rely on a stateless, client-server, cacheable communications protocol (e.g., HTTP). REST can be described as an architecture style for designing networked applications, and uses HTTP to make calls between machines. So called RESTful applications use HTTP requests to post data (e.g., create and/or update), read data (e.g., make queries), and delete data. Although implementations of the present disclosure are described herein with reference to REST-based interfaces, it is contemplated that implementations of the present disclosure are applicable with any appropriate interfaces.

Independent of the REST-based use cases introduced above, process engines can be used to fulfil goals, and/or logic. Common examples are booking processes (e.g., hotel booking, vehicle rental booking), or purchase processes (e.g., purchasing goods or service from an e-commerce website). Another example includes landscape management systems that execute of management operations in complex datacenters. An example landscape management system includes SAP Landscape Manager (LaMa) provided by SAP SE of Walldorf, Germany.

From a user-perspective, following a workflow through a process is often referred to as a roadmap. Within such a roadmap, users interactively modify data for each step, or keep default values, for example. The following example shows the type of user interactions and the actual value modified:

Step 1:
Enter: Product
Enter: Amount
Unselect: Default selected adds
Keep Value: Default selected x-mas present
Step 2:
Select: Credit card payment
Enter: Credit card data
Step 3:
Enter: Address
Step 4:
Accept: Shipment costs External inputs, outputs from previous steps, and/or context information might be processed in each step to create an output for the respective step. This can be used, for example, for a conditional selection between different subsequent steps, and/or for modifying the options/data/default data within the subsequent steps. The data existing in the roadmap is translated into individual operations within a process being executed by a respective process engine to achieve the actual goal(s). In some examples, the roadmap steps may auto-generate code representing the process without a process engine.

When integrating a software product into a more complex scenario (e.g., where the execution of a roadmap is just a sub-part), interfaces are provided to transfer the information into the roadmap without user interaction. Such integrations can be a time-consuming, resource-inefficient, and error prone process. The technical interfaces are not/insufficiently documented, complicated, complex, and/or do not reflect what users view from the UIs.

In view of this, implementations of the present disclosure provide templates of service calls within a user interface (UI) process. In some examples, the UI process can be handled by a domain user to achieve a particular end (e.g., business task/goal). The template can be subsequently used to directly invoke a respective service. In some implementations, the template can be modified to automatically modify the roadmap (process) behavior within the scope of the original roadmap execution in the UI.

However, even using a template, the REST calls may have structural limitations, may require internal information, and/or be unnecessarily complicated for a given scenario. This requires application experts to do the integration. However, some application experts may not have the time or knowledge of the applications executing the service calls.

Another issue is the structural gap between a roadmap-based internal application model, where the user navigation/execution is interactively step-oriented, and a single one-time service call transferring all required data. Template use at least partially addresses this by dynamically overwriting the step data. However, it maintains the structure of the roadmap. This means, the steps are still visible within the file (e.g., JSON file).

As described herein, implementations of the present disclosure close the knowledge gap between application experts and non-experts integrating the application, and enables reduction of interfaces size (e.g., the number of parameters) by adding scenario-specific expert knowledge to a roadmap automation component (RAC). Further, implementations of the present disclosure provide measures to transfer relatively complex interface format (e.g., structured, deep layers JSON, representing steps of the roadmap) into a simple key value-based format for service calls. This makes the integration relatively easy for complex environments (e.g., SAP ABAP). Additionally, implementations of the present disclosure enable reduction of call payloads, which results in improved performance.

In accordance with implementations of the present disclosure, an existing template is used for a service call, and parts of the request body (e.g., JSON) are automatically changed by dynamically evaluated expressions. In some implementations, the expression is evaluated when the actual value is set in the target environment (e.g., the context of the roadmap step). In some examples, the template is stored, and is used for the processing of an initiating service call. The initiating service call can be of completely different structure, because the expressions are used to translate the initial call to the required target format.

Figure 1:
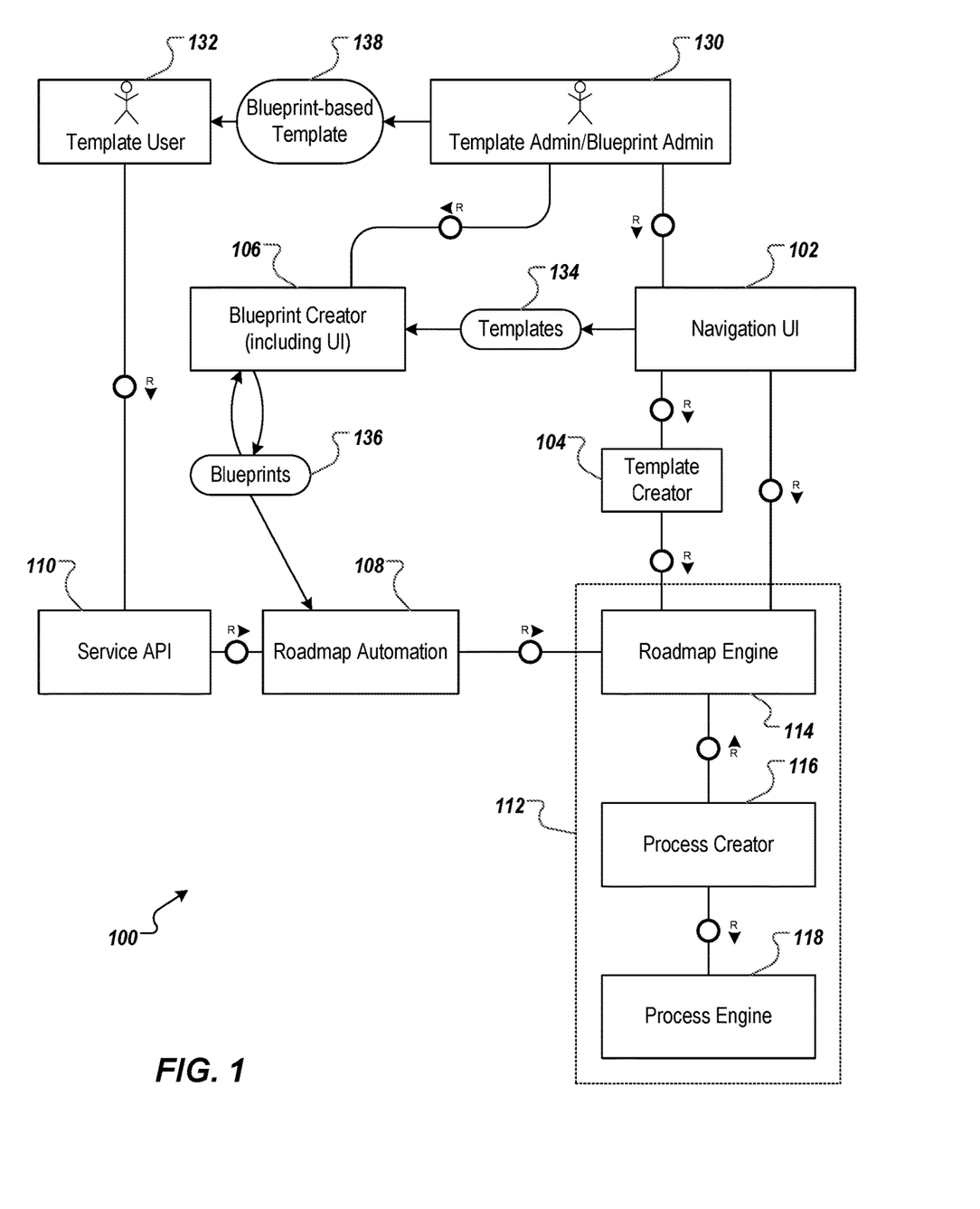
FIG. 1 depicts an example conceptual architecture in accordance with implementations of the present disclosure.

FIG. 1 depicts an example conceptual architecture 100 in accordance with implementations of the present disclosure. In the depicted example, the conceptual architecture includes a navigation UI 102, a template creator 104, a blueprint (BP) creator 106, a roadmap automation component (RAC) 108, a service API 110, and a processing module 112. In the depicted example, the processing module 112 includes a roadmap engine 114, a process creator 116, and a process engine 118. As described in further detail herein, a first user 130, and a second user 132 interact with one or more components through respective UIs. In some examples, the first user 130 is an administrator that creates templates, and/or blueprints, as described herein. In some examples, the second user 132 uses existing templates, and modifies the templates for a particular service call, as described in further detail herein. The conceptual architecture 100 also includes a template store 134 for storing templates (e.g., as computer-readable files), and a blueprint store 136 for storing blueprints (e.g., as computer-readable files). As described in further detail herein, a blueprint-based template 136 can be provided.

In some examples, the blueprint-based template defines a service call for a respective blueprint. That is, for example, the blueprint-based template is used to create a service call that matches the blueprint. In this manner, documentation is not required due to the limited interface size, and meaningful names.

In further detail, the navigation UI 102 is displayed on a computing device that is used by the first user 130. In some examples, the navigation UI 102 is displayed in a browser executed on the computing device (e.g., displayed as a web page of a web application). In some implementations, the navigation UI 102 enables the first user 130 to modify data of the roadmap by accessing the roadmap engine 114, and enables the first user 130 to create one or more templates (e.g., stored in the template store 134) by accessing the template creator 104. In some examples, the template creator 104 creates the template based on a difference (delta) between a prefilled context for a roadmap (process) step, and a user-provided context.

As described herein, a template corresponds to a roadmap (process), which includes multiple steps. In some examples, the template defines process logic, and configuration data. For example, a template defines process logic for each step of the roadmap. In some examples, configuration data is provided for each step, and includes data that is specific to execution of the particular step (e.g., executed as the process logic).

A non-limiting, example template is provided below, and is associated with a product purchase process (roadmap). It is contemplated, however, that implementations of the present disclosure are applicable to any appropriate process.

```
{
  "RoadmapID": "myOrderRoadMap",
    "Step 1": {
      "productId": "ID2555454215",
      "productAmount": 4,
      "adds": false,
    },
    "Step 2": {
      "paymentMethod":"Creditcard",
      "cardOwner":"Mad Max",
      "cardNo":"123456789",
      "check":"123"
    },
    "Step 3": {
      "Name":"Mad Max",
      "Street":"Mainroad",
      "no":"42",
      "city":"Sealand"
    }
    "Step 4": {
      "serviceDelivery":"ShipCo",
      "acceptShipmentCosts":"TRUE"
    }
}
```

Listing 1: Example Template

The example template of Listing 1 is based on the example roadmap above. It can be noted that the default selected "x-mas present" is not part of the template. In this example, the default value has been kept by the template administrator navigating through the roadmap. However, in accordance with implementations of the present disclosure, this is an optional part of the template (e.g., to manually mark it as keep default). In some examples, a blueprint expressions (BPE), described in further detail herein, can be provided to show that a certain value has not been changed. This enables the values to be intentionally changed, or kept as is. If the template creator 104 does not do this, the information about the existence of such a value would never reach the first user 130.

In some examples, the blueprint creator 106 provides blueprints of respective processes (roadmaps). A non-limiting, example blueprint is provided below, and is associated with the example product purchase process (roadmap). It is contemplated, however, that implementations of the present disclosure are applicable to any appropriate process.

```
{
  "RoadmapID": "myOrderRoadMap",
    "Step 1": {
      "productId":".toUpper($search(<Product Name >)@id)",
      "productAmount": <Quantity>,
      "adds" : false,
    },
    "Step 2": {
      "paymentMethod":"Creditcard",
      "cardOwner":"<Name>",
      "cardNo":"$search(<Name>)@creditCard@no",
      "check":"$search(<Name>)@creditCard@check"
    },
    "Step 3": {
      "Name":"<Name>",
      "Street":"$search(<Name>)@address@street",
      "no":"$search(<Name>)@address@no",
      "city":"$search(<Name>)@address@city"
    }
    "Step 4": {
      "serviceDelivery":"&DeliveryType<Logistics>",
      "acceptShipmentCosts":"TRUE"
    }
}
```

Listing 2: Example Roadmap Blueprint

In the example of Listing 2, it is assumed that the blueprint administrator (e.g., the first user 130) knows that only registered users will access the service. In this manner, the name can be used as a reference to automatically retrieve most of the required data. The example Listing of FIG. 2 includes multiple BPEs including so-called escape characters, example BPEs being described in further detail herein. In some instances, escape characters of the BPEs can be overloaded. This means that the same escape characters may refer to different interpretations, and the used interpretation may be based on a ranked order (or other mechanisms). Although the blueprint has a similar structure as the underlying template, the blueprint provides abstractions through use of BPEs. For example, while the template provides a specific product identifier (e.g., "ID2555454215"), the blueprint provides a BPE (e.g., ".toUpper ($search(<Product Name>) @ id)") that can be evaluated to provide the product identifier.

In some implementations, the blueprint creator 106 enables the first user 130 to add one or more BPEs to a template. In some examples, the blueprint creator 106 includes a UI (e.g., displayed as a web page of a web application), and a logic layer. In some examples, a template can be retrieved from the template store 134, and the first user 130 can add one or more BPEs to the template. In some implementations, the blueprint creator 106 can automatically replace parts of the template with one or more BPEs. In some examples, the blueprint creator can use information used for applying automation of the roadmap (e.g., annotations in the respective code base representing roadmap steps. The blueprint creator 106 stores the blueprint in the blueprint store 136, each blueprint being assigned a unique identifier (e.g., blueprint name), and additional metadata (e.g., identifier of user(s) that edited the blueprint).

In some implementations, and as described herein, a template becomes a blueprint when modified with one or more BPEs. The modified template can also be referred to as a blueprint-based template.

Example BPEs are described in further detail herein. In some examples, one or more BPEs can be combined. In some examples, BPEs translate the service call into a target format. A BPE's logic can be hard-coded, and the specific logic can be identified by a respective escape character with a subsequent string, for example. However, overloading of escape characters can occur. In such cases, the correct logic for evaluating a respective BPE can be selected on a (dynamically) calculated ranking, for example.

An example BPE includes a modifier. An example modifier includes .toUpper (e.g., see Listing 2 above), the escape character being provided as a period (.). In some examples, a modifier performs a rather syntactical transformation of a result (e.g., modifying letters or time formats). Another example BPE includes a service mapper. An example service mapper includes &DeliveryType (e.g., see Listing 2 above), the escape character including an ampersand (&). In some examples, a service mapper maps one input type to another. In the example of Listing 2, a delivery type selected as EXPRESS will be mapped to a concrete instance of a logistics company offering express delivery. Another example service mapper maps a pool name containing several hosts to a particular host from that pool.

Another example BPE includes a transform. An example transform includes $search(<Name>)@creditCard@no (e.g., see Listing 2 above), the escape character including $ [@]. In some examples, a transformer an input type to an output type where no direct mapping exists. In the above example, a search option may search for the name of a customer, and returns a customer object. Attributes of the customer object can be iteratively accessed based on the @ character. In some examples, accessing attributes can be executed by reflection, accessing persistence layers (e.g., via SQL), or by navigating along REST modelled resources/services.

Another example BPE includes a substitution, which includes one or more input key values. An example substitution includes <Name> (e.g., see Listing 2 above), the escape character including < >. In some examples, a substitution replaces a value by a key value defined input parameter from the blueprint service call that accesses a context of the current step (e.g., using reflection/annotations, DB access). In some examples, a substitution replaces a value by accessing a context of a previous step. In some examples, a substitution replaces a value by accessing a roadmap-independent context (e.g., a system landscape). In some examples, a priority and order of these options can depend on the implementation scenario. In some examples, two or more of the options can be combined.

In some examples, one or more BPEs function on a roadmap-independent context. This may include, for example, landscape information or goal/roadmap target based limited views to a subset of this landscape. This context may even refer to the processing of the blueprint itself, and/or being dynamically created based on one or more of a target environment/system of the blueprint, a source environment/system of the blueprint, previous parameters processed in the blueprint, and BPE tags.

In some implementations, constraints can be provided to define contexts, and/or limit results. In some examples, a system-wide configuration can be provided, which can limit tenant views to existing data. In some examples, a dedicated tag may either limit the results of a BPE, or the scope of a context before executing the BPE on it. An example is provided as $search(<Name>)#internal, with the escape character include a hash (#). In this example, the keyword internal adds a constraint to the context used for search, and/or the results of the search. In some examples, the constraint is to entities that have already been referenced by the blueprint/roadmap/process. An example could be a system name, where the system has already been created in the processing steps. Another example can include a reference to an order number that has been created in a previous step. Another example constraint includes #instance, where only instances of systems will be used for further processing. In some examples, the constraint can include additional parameters (e.g., #instance(serviceType=Database&systemIdLength=3)).

In some implementations, string concatenations can be used in a BPE. For example, a value can be a concatenation of a hardcoded string, and the result of one or more BPEs, or a combination of strings and BPEs. In some implementations, one or more default values can be used in the event that a BPE returns an empty result set, throws an exception, or does not terminate within a given time frame.

Referring again to FIG. 1, the roadmap engine 114 contains the actual roadmap (abstract definition of ordered steps). In some examples, each step contains the logic or knowledge on how one or more sub-tasks based on concrete context information. In some examples, the process creator 116, and the process engine 118 function together to perform processing based on the roadmap definition. In some instances, the process creator 116, and the process engine 118 are not provided. In such cases, the roadmap is directly executed after each user navigation event between steps, or at the end of the roadmap. A separation between a processing engine, and the roadmap engine 114 enables an interactive UI, even though the tasks are executing. In some examples, the roadmap automation 108 at least partially automates user interaction to apply a service call based on the previously created template.

In accordance with implementations of the present disclosure, the service call can be referred to as a blueprint service call. Continuing with the above examples, an example service call is provided as:

```
{
  "BlueprintID": "BP1",
  "parameters": {
     "Product Name" : "Oil",
     "Quantity" : "4"
     "Name" : "Mad Max",
     "logistics" : "EXPRESS"
  }
}
```

Listing 3: Example Service Call

The example of Listing 3 illustrates the significantly reduced amount of data required for service calls in accordance with implementations of the present disclosure. Further, implementations of the present disclosure remove the structure of a roadmap within a service call, such that the service call becomes a flat structure of key value pairs.

Implementations of the present disclosure enable simplified service calls. That is, for example, service calls that include key-value pairs. More particularly, and as described herein, a template is provided based on a roadmap, the roadmap defining a process that is to be executed, the process including multiple steps. A template is structured based on the steps of the roadmap. For example, the example template of Listing 1 is structured based on the example roadmap introduced above, which is directed to product ordering and payment.

In accordance with implementations of the present disclosure, a blueprint is provided based on a respective template. The blueprint is structured like the template (e.g., in terms of steps of the process), but includes abstractions. One or more abstractions are provided as BPEs. For example, the example blueprint of Listing 2 includes the BPE ":".toUpper($search(<Product Name>)@id)" for the key "productId", while the example template of Listing 1 includes the specific value "ID2555454215".

As described herein, a service call is flat, including key-value pairs. That is, the service call is not structured (e.g., like the underlying blueprint, and template). The service call includes a blueprint identifier, such that the underlying blueprint can be retrieved, and executed in response to the service call. For example, the blueprint identified in the call is retrieved, and one or more key-value pairs are used to process the underlying roadmap. That is, for example, the roadmap automation applies the provided key-value pairs. In some examples, a value of the service call is used as input to a BPE, which is processed to determine another value. For example, the example service call of Listing 3 includes the key (parameter)-value pair "Product Name":"Oil". In response to the service call, the underlying blueprint is identified (e.g., based on "BluprintID": "BP1"), and is retrieved from the blueprint store. The value oil is input for the parameter Product Name in the BPE ".toUpper($search(<Product Name>)@id)" (see Listing 2). In this manner, the BPE is evaluated in response to the service call to determine the parameter productId as ID2555454215. In some examples, the remaining parameters are determined (e.g., by evaluating BPEs), to execute the roadmap in a single service call.

Figure 2:
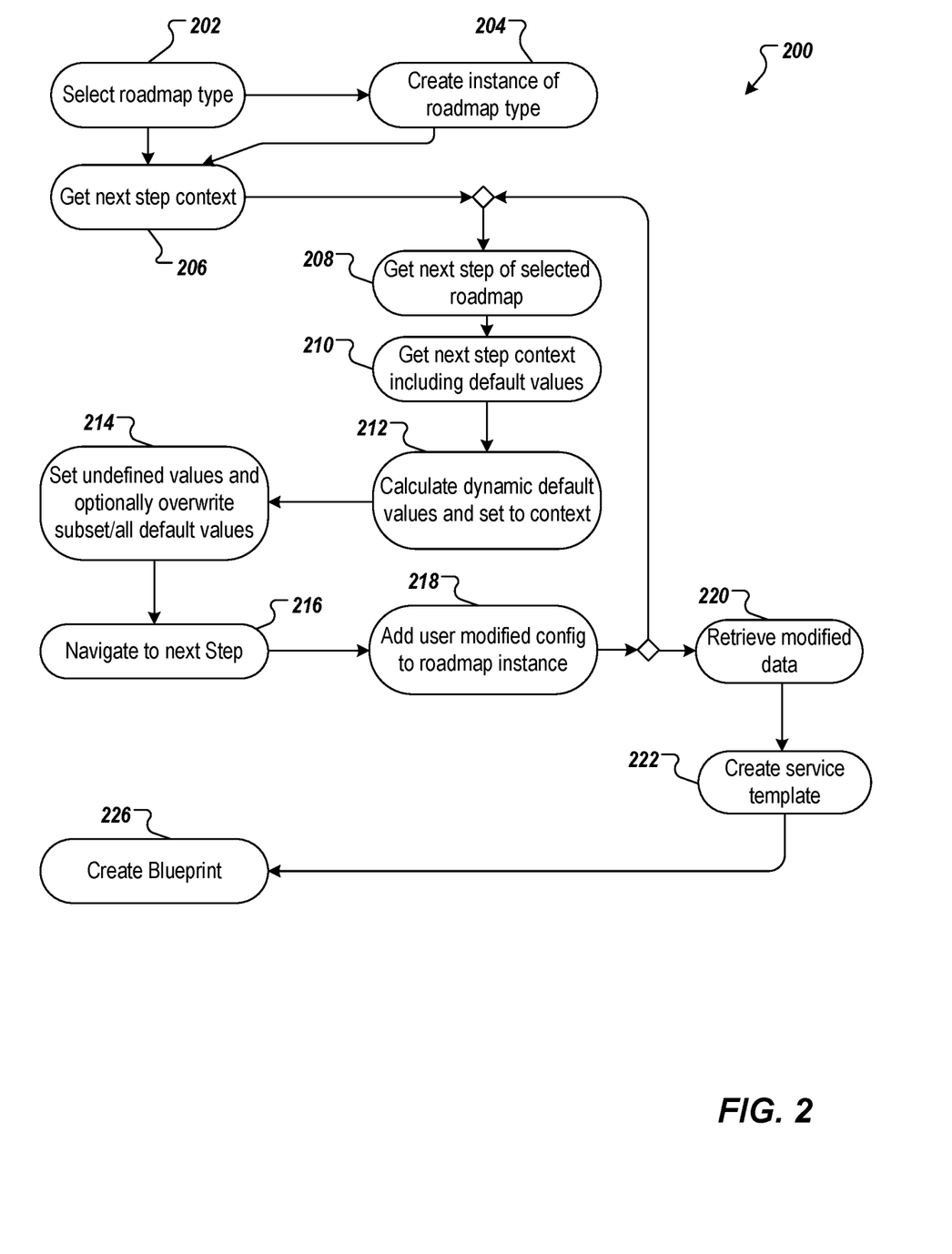
FIG. 2 depicts an example template creation process in accordance with implementations of the present disclosure.

FIG. 2 depicts an example template creation process 200 in accordance with implementations of the present disclosure. In some examples, at least part of the example process 200 can be provided by one or more computer-executable programs executed using one or more computing devices.

A roadmap type is selected (202). For example, the first user 130 interacts with the navigation UI 102 to select the roadmap type. In some examples, a set of predefined roadmaps (e.g., online product purchase, online hotel booking) can be provided, from which the roadmap type is selected. An instance of the roadmap type is created (204). For example, the roadmap engine 114 creates the instance of the selected roadmap type.

A context for the next step is retrieved (206), and a next step of selected roadmap is determined (208). For example, in an initial iteration, a first step of the roadmap is processed as described herein. A context is determined for the next step (210). For example, the roadmap engine determines the context of the step currently being considered. In some examples, the context includes one or more default values. Dynamic default values are created, and are set to the context (212). For example, the roadmap engine provides the default values. Any undefined values are set, and one or more default values can be (optionally) overwritten (214). For example, the first user 130 can set values, and/or change default values using the navigation UI 102. The next step is navigated to (216), and user-modified configuration data is added to the roadmap instance for the specific step (218).

It is determined whether there are additional steps in the roadmap. If so, the example process 200 loops back. If not, modified data for each step context is retrieved (220), and a template is created (222). In some examples, the template is created as a computer-readable file (e.g., JSON file). A blueprint is created for the template (224), as described in further detail herein with reference to FIG. 4.

Figure 3:
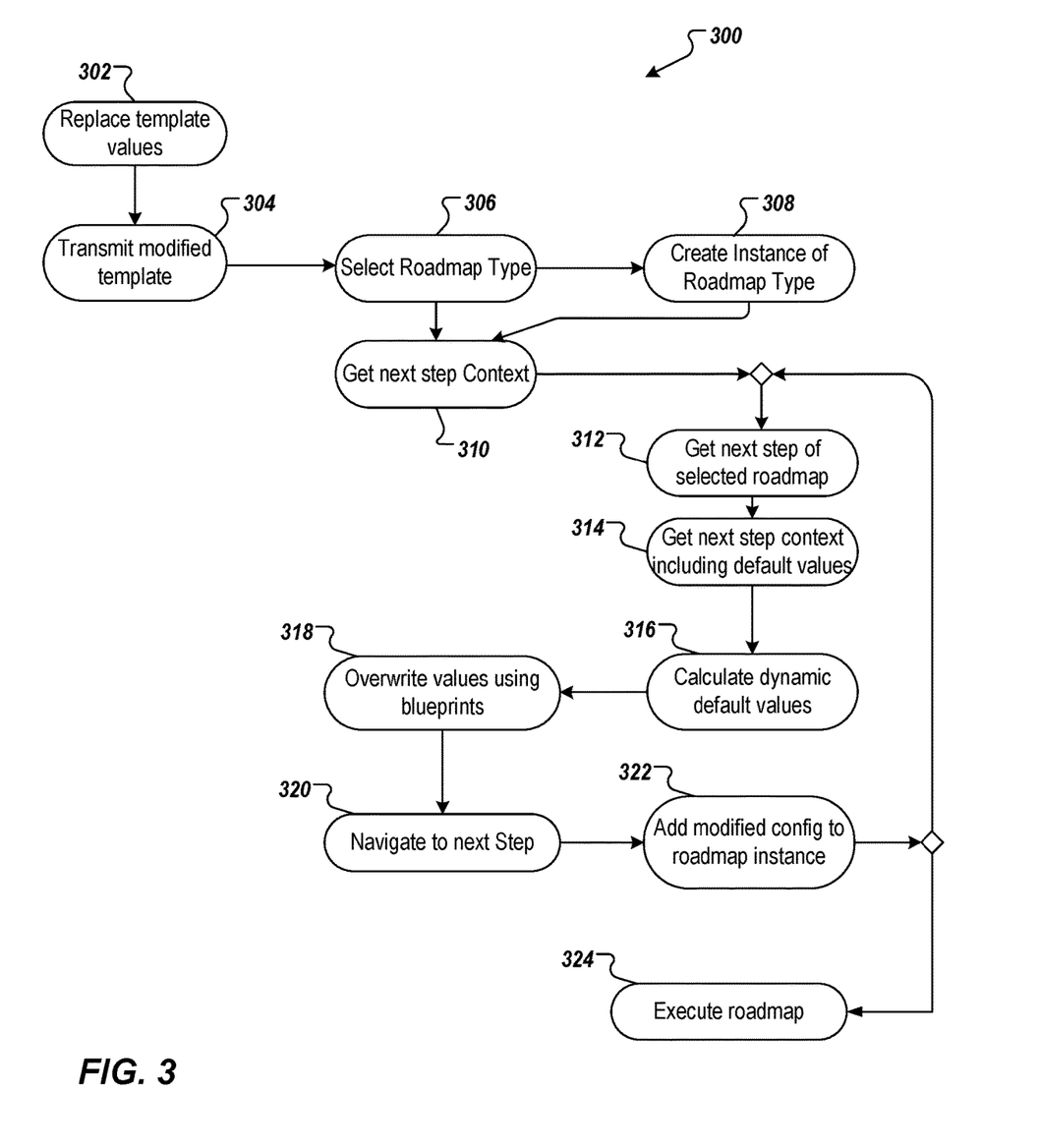
FIG. 3 depicts an example template application process in accordance with implementations of the present disclosure.

FIG. 3 depicts an example template application process 300 in accordance with implementations of the present disclosure. In some examples, the example process 300 can be provided by one or more computer-executable programs executed using one or more computing devices.

One or more template values are replaced (302). For example, the second user 132 receives a template, and modifies the template to by replacing template values. For example, values for product name, and/or quantity can be modified. The modified template is transmitted (304). For example, the modified template is transmitted to the roadmap automation 108. A roadmap type is selected (306), and an instance of the roadmap is created (308). A context of a next step is determined (310). A next step of the roadmap is determined (312). A context is determined for the next step (314). For example, the roadmap engine determines the context of the step currently being considered. In some examples, the context includes one or more default values.

Dynamic default values are created, and are set to the context (316). For example, the roadmap engine provides the default values. One or more values are overwritten (318). For example, the roadmap automation overwrites one or more values of a current step based on a respective blueprint. The next step is navigated to (320), and user-modified configuration data is added to the roadmap instance for the specific step (322). It is determined whether there are additional steps in the roadmap. If so, the example process 300 loops back. If not, the roadmap is provided for execution (324).

Figure 4:
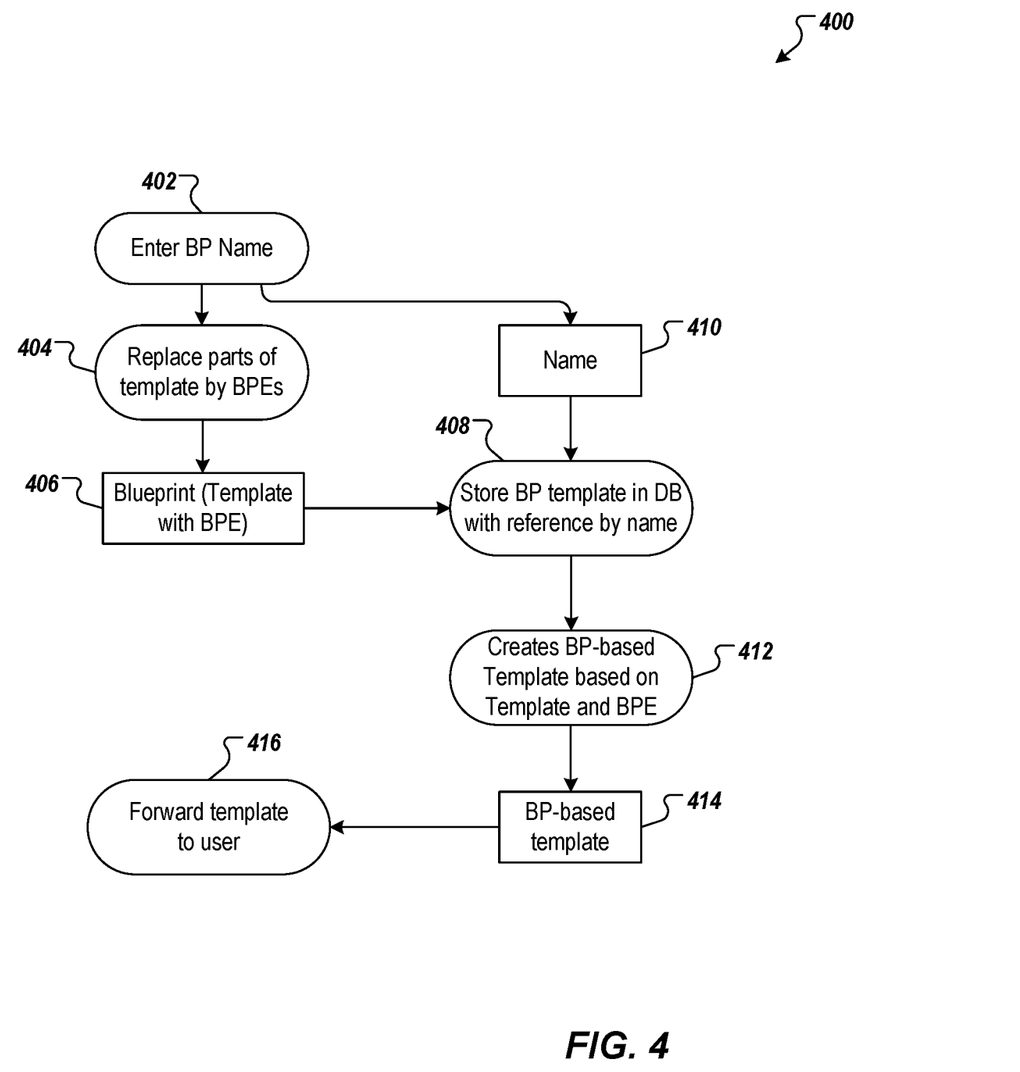
FIG. 4 depicts an example blueprint creation process in accordance with implementations of the present disclosure.

As described in further detail below with reference to FIGS. 4 and 5, a template is applied to trigger roadmap processing using an initial technical service invocation. FIG. 4 depicts an example blueprint creation process 400 in accordance with implementations of the present disclosure. In some examples, at least a portion of the example process 400 can be provided by one or more computer-executable programs executed using one or more computing devices.

A blueprint (BP) name is provided (402). For example, the first user 130 uses the navigation UI 102 to provide a BP name for a blueprint that is being created. Consequently, a data object name 410 is provided (e.g., "BP1"). The name 410 is used to reference the blueprint in subsequent service calls. One or more parts of the template are replaced by respective BPEs (404). For example, the first user 130 can replace values within the blueprint with BPEs. Consequently, a data object blueprint 406 is provided, and includes a template and BPEs. The template and respective BPE(s) are stored (408). The BP-based template (414) is provided (412), and is made available for use (416).

Figure 5:
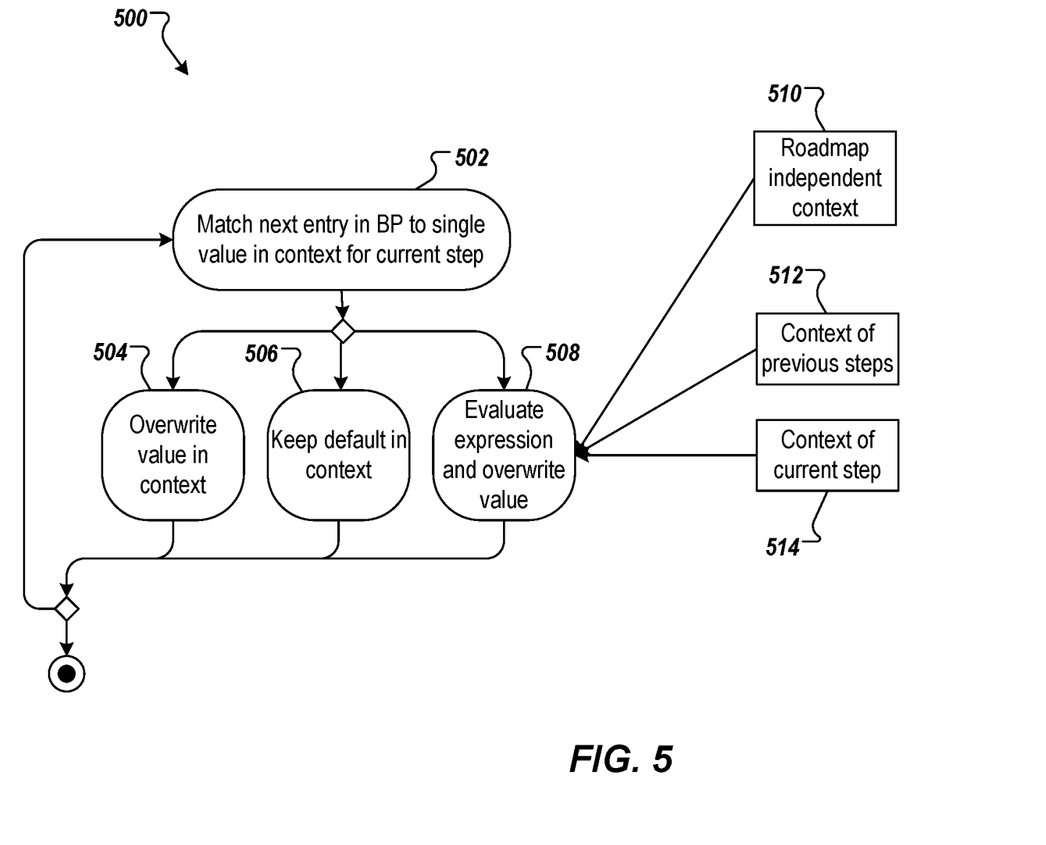
FIG. 5 depicts an example blueprint application process in accordance with implementations of the present disclosure.

FIG. 5 depicts an example blueprint application process 500 in accordance with implementations of the present disclosure. In some examples, at least a portion of the example process 500 can be provided by one or more computer-executable programs executed using one or more computing devices.

At the outset, an entry in a BP is matched to a single value within the context of a current step (502). It can be determined whether the value is to be overwritten (504), a default value is to be kept (506), or a BPE is to be evaluated to overwrite the value (508). For example, the template can include a hard-coded value that is to be changed. The example process 500 loops through each step of the underlying roadmap, determining values that are used to perform the process defined by the roadmap. The example process 500 uses a data object roadmap independent context (510), a data object context of previous steps (512), and a data object context of current step (514) as input. In some examples, and with respect to the roadmap independent context 510, data that might be accessed during the evaluation of a BPE is determined. However, depending on the goal (e.g., target environment of the roadmap) this context might be dynamically adjusted, limited or accessed based on a specific view to provide the information needed for this particular service call. It may contain, for example, system configurations of the roadmaps target/source systems, or properties/parameters previously entered by users of the system. These previously entered properties/parameters might be related to other entities already existing. In some examples, when setting a value to the context of a specific step either a default value is used for the context, is overwritten by a hardcoded value in the blueprint, or is overwritten by a value evaluated at runtime using a BPE.

Implementations of the present disclosure provide one or more of the following example advantages. In traditional approaches, a developer provides their own code using a general-purpose programming language to translate different data formats, and results in relatively large amounts of data for the service calls. In contrast, implementations of the present disclosure automate the process, and provide simplified service calls reducing the amount of data. By persisting the target format together with the BPE close to the target services execution environment, implementations of the present disclosure enable smooth integration, and leverages access to data that exists only in the target service providing system, at runtime, and at the point in time when the roadmap is executed.

Accordingly, implementations of the present disclosure reduce complexity by reducing the parameters, and also by modifying the actual structure. This makes it more applicable for the REST pattern, where the concept roadmap is unknown, and also makes it more applicable for other programming languages (e.g., languages using tabular data formats, such as SAP ABAP). A roadmap can be described as providing a stateful pattern used to keep state of the current step position, data previously entered, and the like (in contrast to stateless mechanisms, such as REST). Further, implementations of the present disclosure enable relatively rapid provision of use case specific interfaces that can easily be consumed by other services. This feature can be used by customers of the actual service providing application, and the developers of such an application to easily provide customer-specific solutions without changing the code base.

Figure 6:
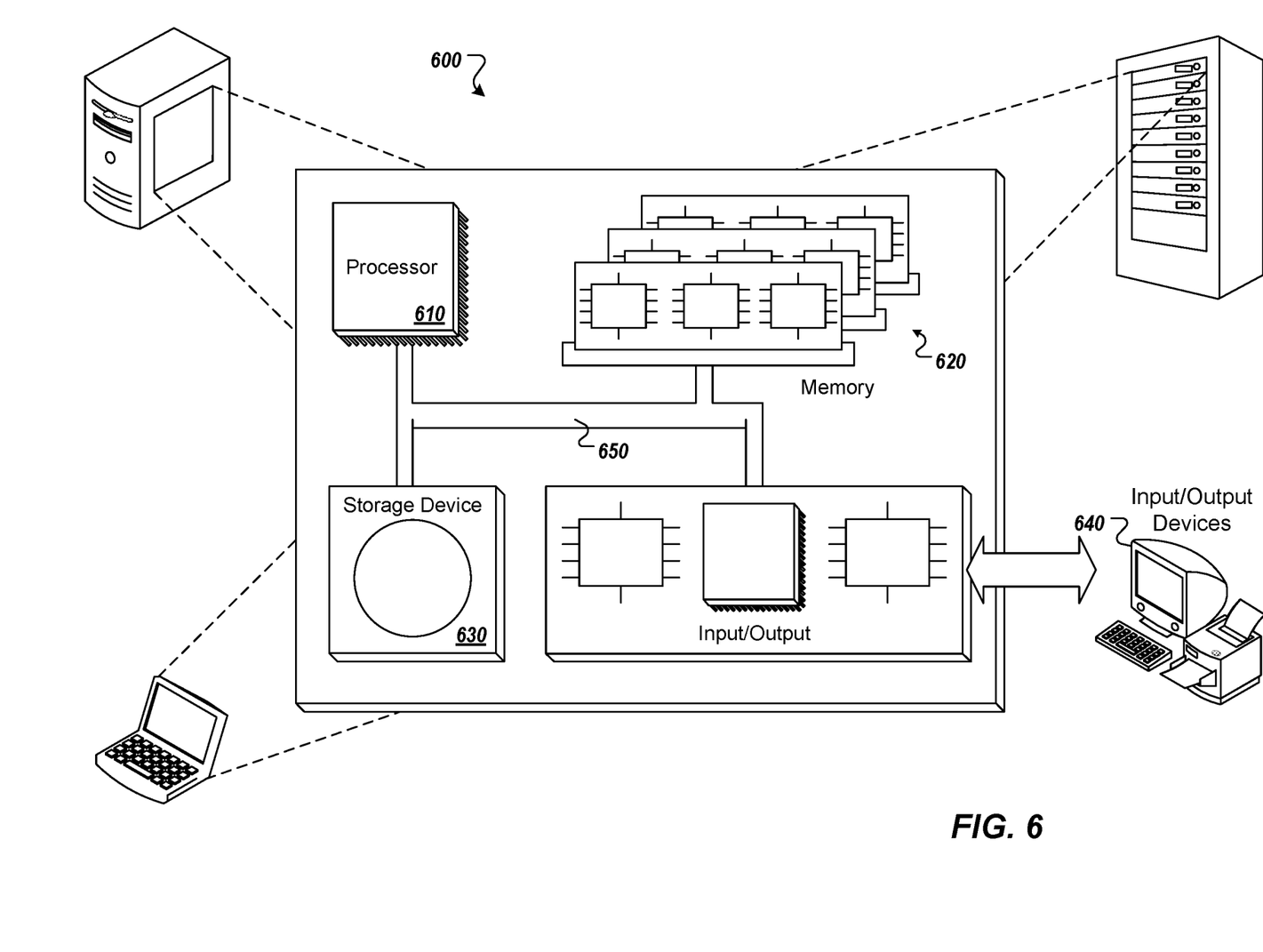
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing service calls, the method being executed by one or more processors and comprising:
    providing, by the one or more processors, a blueprint that is based on a template that defines a process comprising two or more steps, and, for each step, reciting at least one set value for execution of the process, the blueprint comprising one or more blueprint expressions, each blueprint expression replacing a set value of the template as an abstraction of the set value, each blueprint expression comprising logic, the logic comprising one of a modifier, a service mapper, a transform, and a substitution;
    receiving a service call comprising a flat structure of a set of key-value pairs, each key comprising a parameter represented within the process and each value comprising a value of a respective parameter, the value being used in execution of the process;
    in response to the service call, retrieving the blueprint from a blueprint store;
    for each blueprint expression included in the blueprint, determining, by the one or more processors, a specific value by processing a value of a key-value pair included in the service call through logic of a blueprint expression that identifies the key of the key-value pair to provide the specific value; and
    providing, by the one or more processors, specific values to populate respective parameters within the process for execution of the process.

2. The method of claim 1, wherein the template is structured based on the process and includes at least one value that is specific to an implementation of the process.

3. The method of claim 1, wherein the blueprint is structured based on the template, and each blueprint expression is an abstraction of a respective value of the template.

4. The method of claim 1, wherein a roadmap automation component receives the service call, and retrieves the blueprint.

5. The method of claim 1, wherein providing the blueprint comprises retrieving the blueprint from a blueprint repository based on a blueprint identifier provided in the service call.

6. The method of claim 1, wherein the blueprint is provided in object notation.

7. The method of claim 1, wherein the service call comprises a Representational State Transfer (REST) service call.

8. A non-transitory computer-readable storage medium coupled to one or more processors and having instructions stored thereon which, when executed by the one or more processors, cause the one or more processors to perform operations for executing service calls, the operations comprising:
    providing a blueprint that is based on a template that defines a process comprising two or more steps, and, for each step, reciting at least one set value for execution of the process, the blueprint comprising one or more blueprint expressions, each blueprint expression replacing a set value of the template as an abstraction of the set value, each blueprint expression comprising logic, the logic comprising one of a modifier, a service mapper, a transform, and a substitution;
    receiving a service call comprising a flat structure of a set of key-value pairs, each key comprising a parameter represented within the process and each value comprising a value of a respective parameter, the value being used in execution of the process;
    in response to the service call, retrieving the blueprint from a blueprint store;
    for each blueprint expression included in the blueprint, determining a specific value by processing a value of a key-value pair included in the service call through logic of a blueprint expression that identifies the key of the key-value pair to provide the specific value; and
    providing specific values to populate respective parameters within the process for execution of the process.

9. The computer-readable storage medium of claim 8, wherein the template is structured based on the process and includes at least one value that is specific to an implementation of the process.

10. The computer-readable storage medium of claim 8, wherein the blueprint is structured based on the template, and each blueprint expression is an abstraction of a respective value of the template.

11. The computer-readable storage medium of claim 8, wherein a roadmap automation component receives the service call, and retrieves the blueprint.

12. The computer-readable storage medium of claim 8, wherein providing the blueprint comprises retrieving the blueprint from a blueprint repository based on a blueprint identifier provided in the service call.

13. The computer-readable storage medium of claim 8, wherein the blueprint is provided in object notation.

14. The computer-readable storage medium of claim 8, wherein the service call comprises a Representational State Transfer (REST) service call.

15. A system, comprising:
a computing device; and
a computer-readable storage device coupled to the computing device and having instructions stored thereon which, when executed by the computing device, cause the computing device to perform operations for executing service calls, the operations comprising:
providing a blueprint that is based on a template that defines a process comprising two or more steps, and, for each step, reciting at least one set value for execution of the process, the blueprint comprising one or more blueprint expressions, each blueprint expression replacing a set value of the template as an abstraction of the set value, each blueprint expression comprising logic, the logic comprising one of a modifier, a service mapper, a transform, and a substitution;
receiving a service call comprising a flat structure of a set of key-value pairs, each key comprising a parameter represented within the process and each value comprising a value of a respective parameter, the value being used in execution of the process;
in response to the service call, retrieving the blueprint from a blueprint store;
for each blueprint expression included in the blueprint, determining a specific value by processing a value of a key-value pair included in the service call through logic of a blueprint expression that identifies the key of the key-value pair to provide the specific value; and
providing specific values to populate respective parameters within the process for execution of the process.

16. The system of claim 15, wherein the template is structured based on the process and includes at least one value that is specific to an implementation of the process.

17. The system of claim 15, wherein the blueprint is structured based on the template, and each blueprint expression is an abstraction of a respective value of the template.

18. The system of claim 15, wherein a roadmap automation component receives the service call, and retrieves the blueprint.

19. The system of claim 15, wherein providing the blueprint comprises retrieving the blueprint from a blueprint repository based on a blueprint identifier provided in the service call.

20. The system of claim 15, wherein the blueprint is provided in object notation.

* * * * *